United States Patent [19]
Ko et al.

[11] Patent Number: 5,188,807
[45] Date of Patent: * Feb. 23, 1993

[54] APPARATUS FOR PRODUCING HIGH YIELD SODIUM HYDROSULFITE

[75] Inventors: Jeremy Ko, Boston; Steven H. Levis, Haverhill, both of Mass.

[73] Assignee: Morton Thiokol, Inc., Chicago, Ill.

[*] Notice: The portion of the term of this patent subsequent to Nov. 29, 2005 has been disclaimed.

[21] Appl. No.: 764,752

[22] Filed: Sep. 24, 1991

Related U.S. Application Data

[60] Division of Ser. No. 609,129, Nov. 1, 1990, Pat. No. 5,094,833, which is a continuation of Ser. No. 294,076, Jan. 5, 1989, abandoned.

[51] Int. Cl.$^5$ .................................................. B01F 5/00
[52] U.S. Cl. ................................... 422/224; 422/196; 422/197; 422/188; 422/228; 366/338
[58] Field of Search ............... 422/224, 228, 188, 196, 422/197; 366/338, 339

[56] References Cited

U.S. PATENT DOCUMENTS

| | | | |
|---|---|---|---|
| 3,985,674 | 10/1976 | Ellis et al. | 423/515 |
| 4,208,136 | 6/1980 | King | 366/338 |
| 4,222,672 | 9/1980 | Shaw | 366/338 |
| 4,534,659 | 8/1985 | Dourdeville et al. | 366/338 |
| 4,534,954 | 8/1985 | Little et al. | 252/188.23 |
| 4,674,888 | 6/1987 | Carlson | 366/338 |
| 4,680,136 | 7/1987 | Bernhard | 423/515 |
| 4,788,041 | 11/1988 | Sanglet | 423/515 |
| 4,824,614 | 4/1989 | Jones | 366/338 |
| 4,850,705 | 7/1989 | Horner | 366/338 |
| 4,859,447 | 8/1989 | Sanglet | 423/515 |

FOREIGN PATENT DOCUMENTS

| | | | |
|---|---|---|---|
| 660586 | 4/1963 | Canada | 423/515 |
| 27369 | 4/1981 | European Pat. Off. | 423/515 |
| 0202210 | 11/1986 | European Pat. Off. | |
| 3427297 | 4/1976 | Fed. Rep. of Germany | 423/515 |
| 8810334 | 12/1988 | World Int. Prop. O. | 252/188.72 |

OTHER PUBLICATIONS

BOROL "All-Liquid Sodium Hydrosulfite Generation System for Reductive Bleaching of Pulp" product lit. of Ventron Corp. BOROL product literature of Thiokol/-Ventron Division.

*The Bleaching of Pulp* 3rd ed. 1979 TAPPI press R. P. Singh, Editor pp. 271 and 273.

(List continued on next page.)

*Primary Examiner*—Robert J. Warden
*Assistant Examiner*—Laura E. Collins
*Attorney, Agent, or Firm*—Gerald K. White

[57] ABSTRACT

An improved high yield apparatus for producing sodium hydrosulfite is disclosed wherein sodium borohydride, sulfur dioxide, sodium hydroxide and sodium bisulfite are reacted. Improved results are obtained according to the invention by a novel feed system that requires the introduction of a first reaction mixture comprising sodium borohydride, sodium hydroxide and water (i.e., BOROL) into a process flow stream upstream from, i.e. prior to, the introduction of a second reaction comprising either (1) water and sulfur dioxide (first embodiment) or (2) sodium bisulfite and sulfur dioxide (second embodiment).

The best results are realized by combining the just described novel feed arrangement with a system where intimate mixing of both the first reaction mixture and the seocnd reaction mixture and the flow stream. This is achieved by the use of a dual compartmented cylindrical motionless mixer wherein the input means for the first reaction mixture is located at a distance upstream from the first compartment of the mixer that is about the same as the diameter of the mixer and the second reactant mixture input means is similarly located at a distance upstream from the second compartment that is also about the same as the diameter of the mixer.

Improved results are also obtained by using the dual compartmented cylindrical mixer above described in conjunction with the known reactant feed systems involving embodiments (1) and (2) above described, i.e. where the reactant inputs are reversed.

25 Claims, 8 Drawing Sheets

OTHER PUBLICATIONS

John W. Gerrie "Groundwork Brightening with Borol" (reprint p. 1 Pulp and Paper Magazine of Canada 75 No. 7 T251–254 (Jul. 1974).

Paper Age Apr. 1977, Product Literature of Thiokol Corp./Ventron Division.

F. G. Sellers "New Hydrosulfite Route Reduces Groundwood Bleach Costs" *Pulp and Paper* 47 (12), 80 (Nov. 1973).

C. A. Richardson et al. TAPPI 53 (12) Dec. 1970 "Two-Stage Bleaching of High-Yield Pulp at Blandin".

R. G. Guess *Pulp & Paper* Jun. 1979 V. 53(6) pp. 74–77 "Bright News: Lower-Cost Method for TMP and Groundwood Bleaching".

PRIOR ART SYSTEM

APPARATUS FOR PRODUCING HIGH YIELD SODIUM HYDROSULFITE

This application is a divisional of application Ser. No. 07/609,129, filed on Nov. 1, 1990, now U.S. Pat. No. 5,094,833, which in turn is a continuation of application Ser. No. 07/294,076, filed on Jan. 5, 1989, now abandoned.

BACKGROUND OF THE INVENTION

1. Field of the Invention

This invention relates to an improved process and apparatus for producing sodium hydrosulfite. In particular, improved sodium hydrosulfite yields are obtained when contrasted to the prior art.

Sodium hydrosulfite, $Na_2S_2O_4$, also known as sodium dithionite, is extensively used as a bleaching agent in the paper and textile industries, and has a wide range of other uses. Because it is relatively unstable, it is generally produced in situ at the point of use, for example in a pulp mill.

2. Description of the Prior Art

Methods used in the past for producing sodium hydrosulfite have included dissolving zinc in a solution of sodium bisulfite and precipitating zinc-sodium sulfite with milk of lime to leave the hydrosulfite in solution, and reacting sodium formate with sodium hydroxide and sulfur dioxide.

More recent processes include mixing caustic soda and sulfur dioxide with sodium borohydride in an aqueous medium to produce an aqueous solution of sodium hydrosulfite. The sodium borohydride generally enters the process in a mixture with aqueous sodium hydroxide. This mixture, obtainable from the Ventron Division of Morton Thiokol, Inc. under the registered tradmark "BOROL", has good stability because acid hydrolysis of the sodium borohydride is prevented. The first mixture typically comprises 10-15 wt % sodium borohydride, 35-45 wt % sodium hydroxide, and 40-55 wt % water. A typical mixture comprises 12 wt % sodium borohydride, 40 wt % sodium hydroxide, and 48 wt % water. For convenience, this type of process will be referred to hereinafter as the BOROL process.

The theoretical reaction of the BOROL process, assuming ideal conditions and 100% yield, would be as follows:

There is, however, a side reaction in which the sodium borohydride is hydrolyzed, thus reducing the overall efficiency of the reaction:

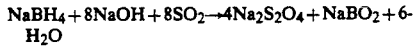

This reaction is a function of pH and increases with reduced pH. The problem cannot, however, be overcome simply by raising the pH since this would adversely affect the main reaction. The reaction effectively takes place in two stages, as follows:

(a) the reaction between sulfur dioxide and caustic soda to give sodium bisulfite (I); and (b) the reaction between the bisulfite and sodium borohydride to give sodium hydrosulfite (II).

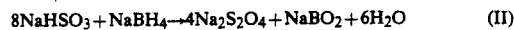

There is also an equilibrium (III) between the bisulfite and sodium sulfite, which is a function of the pH:

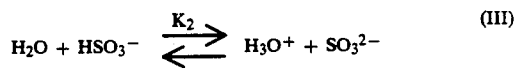

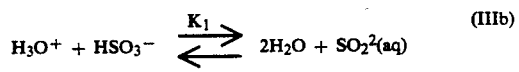

$K_2 = 1.02 \times 10^{-7}$ (18° C.)
$K_1 = 1.54 \times 10^{-2}$ (18° C.)

Above pH 7, the bisulfite concentration is inversely proportional to pH. Below pH 7, the bisulfite concentration is directly proportional to pH. In the pH range 5-7, within which this type of process is generally operated, lowering the pH will favour the formation of bisulfite.

Consideration of this equilibrium, therefore, has to be weighed against that of acid hydrolysis discussed above to determine the optimum pH for process. In the process used hitherto a pH of 6.5 has been found to give the best yield. Nevertheless, it has proved difficult to achieve yields greater than about 85%.

In the sodium hydrosulfite generation process used hitherto, $SO_2$, water, sodium hydroxide (NaOH), and a sodium borohydride/sodium hydroxide/water mixture (BOROL) are fed in that order into a flow line which leads to a static mixer and thence to a degassing tank where entrained gases are vented to the atmosphere. An aqueous solution of sodium hydrosulfite is pumped from the degassing tank, part of this being delivered to a storage tank for use as required and the rest is recycled to the flow line at a position downstream of the $SO_2$, water and NaOH inlets but upstream of the BOROL mixture inlet. The input of each reactant can be controlled automatically in response to rising or falling levels in the degassing tank or the storage tank or changes in pressure, flow rates, and/or pH.

In addition, U.S. Pat. No. 4,788,041 depicts an improvement to the above-discussed process. This improvement obtains higher sodium hydrosulfite yields through variation in proportions of chemicals, pH measurement and control, temperature measurement and control, and specific changes in the recirculation system.

The present invention also obtains higher yields of sodium hydrosulfite but utilizes an inverse order of addition of raw materials to achieve such desirable improvement. This permits easy retrofitting of existing systems.

The present invention also obtains higher yields of sodium hydrosulfite utilizing a two compartment type mixer as depicted in FIGS. 5 and 9 in an overall system having the old order of addition of raw materials as in FIG. 2 (see Example 3), but also includes one having an inverse order of addition of such raw materials as in FIG. 5 (see Example 4).

SUMMARY OF THE INVENTION

A first embodiment involves an improved process and apparatus for producing sodium hydrosulfite by reacting, in aqueous solution, sodium borohydride, sodium hydroxide, sulfur dioxide, and sodium bisulfite by establishing a process flow stream comprising an aqueous mixture of at least sodium hydrosulfite and sodium bisulfite; separately (a) introducing a first reaction mixture comprising sodium borohydride, sodium hydroxide and water, and optionally introducing a solution comprising sodium hydroxide into said process flow stream, then (b) introducing a second reaction mixture comprising either water and sulfur dioxide or sodium bisulfite and sulfur dioxide into said flow stream downstream from the (a) introduction(s) whereby the introduced mixtures react to form an aqueous solution of sodium hydrosulfite in an increased pH environment (as compared to when the first reaction mixture is added downstream of the second reaction mixture).

A second embodiment of the invention involves an improved process and apparatus for producing sodium hydrosulfite, exactly as above described, with the exception (1) that the points of introductions of the (a) reaction mixture is opposite to the above, i.e., downstream of the (b) reaction mixture being inputted into the process flow stream, and (2) further includes a system for rapidly and intimately mixing said first and second mixtures and said process flow stream wherein said reaction mixtures are separately passed into first and second immediately adjacent compartments each containing static mixing elements housed in a single cylindrical motionless mixer, and wherein each said mixture, respectively, is introduced at a distance upstream from each said compartment that is about the same distance as that of said mixer diameter whereby complete mixing of the various added reactant mixtures is achieved within short intervals and low pH gradients are minimized, producing high yield sodium hydrosulfite.

The first embodiment, described above, may also advantageously include a system for rapidly and intimately mixing the reaction mixtures and the process flow stream, which mixing is preferably performed by passing said reaction mixture separately into a two-compartment mixer of the same type in the same manner above described in connection with the second embodiment.

DETAILED DESCRIPTION OF THE INVENTION

As will be more apparent from the information below and the Examples, this invention is an improvement that is believed to be applicable to all prior art processes for generating sodium hydrosulfite through the reaction of sodium borohydride, sodium hydroxide, sulfur dioxide, and sodium bisulfite. The improvement obtained by the invention is that of improving the yield of sodium hydrosulfite, as measured by mass balance. The improvement is obtained by utilizing a system that requires the introduction of a first mixture comprising sodium borohydride, sodium hydroxide, and water prior to the introduction of a second mixture comprising water and sulfur dioxide. The aforementioned prior art systems all introduce the above-mentioned mixtures in opposite order.

Figure 1:
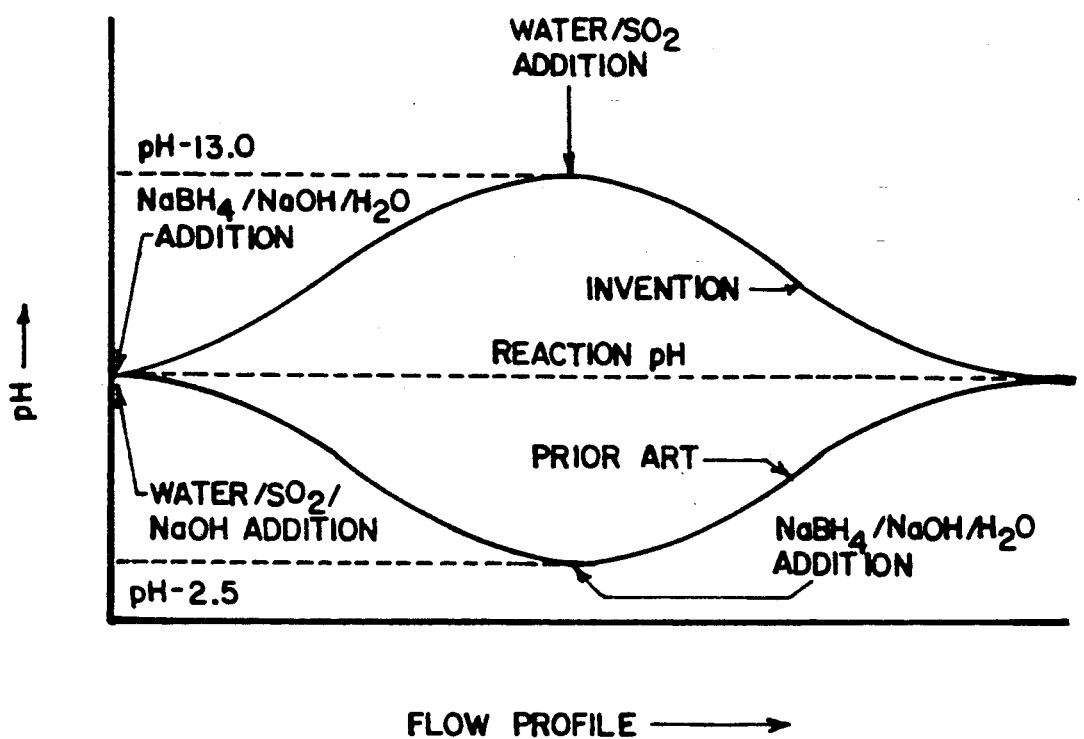
FIG. 1 is a graphical depiction of process stream pH as a function of process flow profile.
Figure 2:
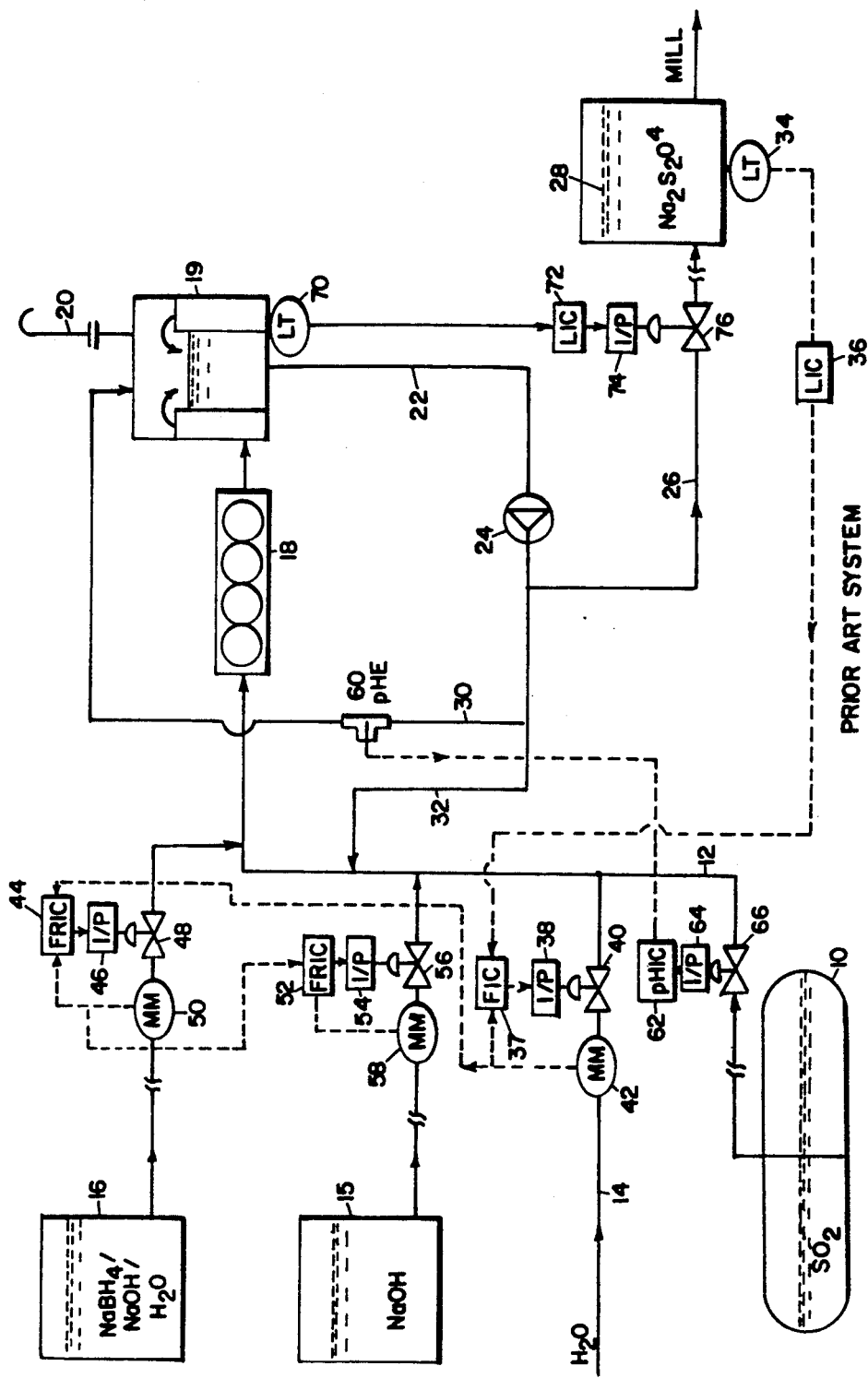
FIG. 2 is a flow diagram illustrating a prior art process described above.
Figure 3:
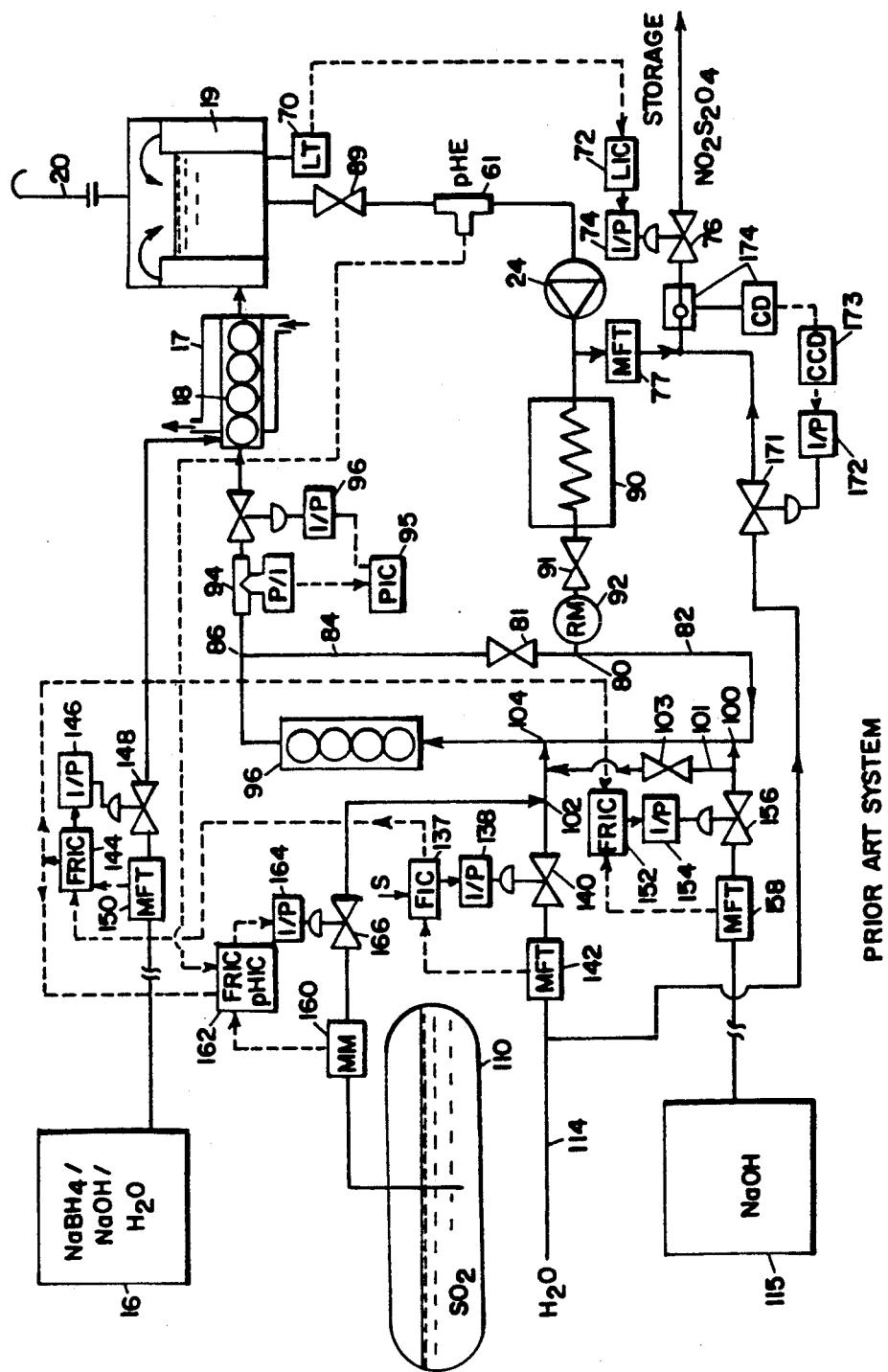
FIG. 3 is a flow diagram illustrating a prior art process as described in U.S. Pat. No. 4,788,041.

FIG. 1 depicts a typical pH flow profile through the mixing and reaction zones of the process stream. In the prior art as illustrated in FIGS. 2 and 3, the mixture of water and $SO_2$ and solution of sodium hydroxide are added to the process stream upstream of the addition of the BOROL solution ($NaBH_4/NaOH/H_2O$) thereby creating an acid medium having a pH of about 2.5, into which the BOROL solution is added. Similarly, referring to FIG. 4, the solution of sodium bisulfite and sulfur dioxide when added to the process stream creates an acid medium (pH 2.5) to which the BOROL solution is added. After the BOROL solution is added to the process stream, the pH of the process stream increases to the desired reaction pH. This pH flow profile is illustrated in FIG. 1 by the graph labeled "Prior Art".

Figure 5:
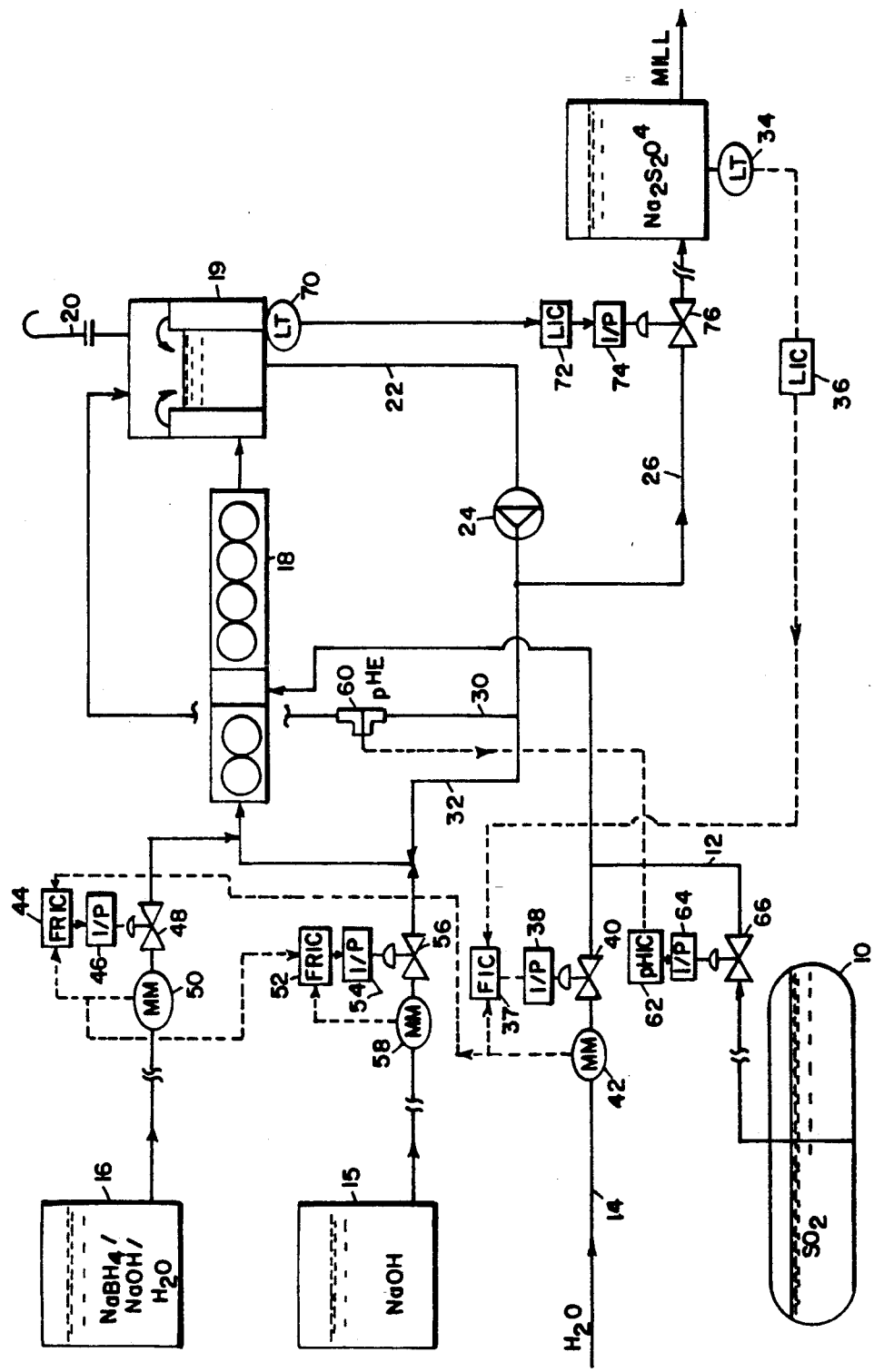
FIG. 5 is a flow diagram that illustrates changes made to the process shown in FIG. 2 that are in accordance with the invention of this application.

In this invention, as illustrated in FIG. 5, the BOROL solution and NaOH solution are added to the process stream upstream of the addition of the mixture of water and sulfur dioxide, thus creating an alkaline medium (pH=13.0) into which the mixture of water and sulfur dioxide is added. After addition of the said water and sulfur dioxide mixture, the pH of the process stream decreases to the desired reaction pH. This pH flow profile is illustrated in FIG. 1 by the graph labeled "Invention".

The pH flow profile becomes significant when related to the hydrolysis rate of the $NaBH_4$. Referring to the Table set forth below, the half-life of $NaBH_4$ is 3000 times longer at a pH of 6.0 compared to a pH of 2.5. Therefore, if the BOROL solution is added to a process stream of pH=2.5, the extent of the hydrolysis of the $NaBH_4$ is greater than if the BOROL solution and NaOH are added first to said process stream of having a pH of =6.2, the pH of said process stream is increased to a pH of 13.0, where the rate of hydrolysis of $NaBH_4$ is very slow (42.6 days).

TABLE $NaBH_4$ HYDROLYSIS
HALF-LIFE vs. pH

| pH | HALF-LIFE |
| --- | --- |
| 2.5 | 0.00012 SEC |
| 4.0 | 0.0037 SEC |
| 5.0 | 0.037 SEC |
| 5.5 | 0.12 SEC |
| 6.0 | 0.37 SEC |

TABLE-continued

NaBH₄ HYDROLYSIS
HALF-LIFE vs. pH

| pH | HALF-LIFE |
|---|---|
| 6.5 | 1.2 SEC |
| 7.0 | 3.7 SEC |
| 8.0 | 36.8 SEC |
| 9.0 | 6.1 MIN |
| 10.0 | 61 MIN |
| 12.0 | 4.3 DAYS |
| 13.0 | 42.6 DAYS |

TEMPERATURE = 25° C. (77° F.)
$LOG_{10}(t_{\frac{1}{2}}) = pH - (0.034 T - 1.92)$
t = MINUTES
T = °K.

It may be clearly seen that adding the BOROL solution to the process stream upstream of the mixture of water/SO₂, creates a more stable medium for the NaBH₄ by increasing the pH of the process stream to having a pH near=13.0. The conversion to sodium hydrosulfite occurs when the solution of water and sulfur dioxide is added to the process stream containing sodium hydrosulfite, NaBH₄, NaOH, and H₂O and the pH decreases to the desired reaction pH of 5.5-6.5.

The NaOH solution is typically mixed with the BOROL solution prior to addition to the process stream. The NaOH solution also may be added to the process stream downstream of the BOROL solution which creates an alkaline environment a pH of 13.0) for the NaBH₄. The NaOH may also be added to the process stream either downstream of the BOROL solution and upstream of the SO₂/water mixture or mixed with the SO₂/water mixture so as to form an aqueous mixture of sodium bisulfite and SO₂ which is subsequently introduced into the process stream downstream of the BOROL solution. For the latter two cases, the pH of the process stream after addition of BOROL solution is near 12.0. At a pH of=12.0, the half-life of the NaBH₄ is 4.3 days. This half-life is many orders of magnitude greater than the half-life at a pH of=2.5 and is significantly greater than the time required for the reaction to produce sodium hydrosulfite.

Minimizing the occurrences of low pH gradients having pH below=5.5 is important to minimize the hydrolysis of the NaBH₄. This can be accomplished by providing chemical reactant addition nozzles and motionless mixers and also minimizing the distance (and time) between chemical reactant addition points.

An additional benefit of adding the BOROL solution to the process stream upstream of the solution of water and sulfur dioxide is the reduction in the formation of sodium thiosulfate (Na₂S₂O₃), a corrosive decomposition product of sodium hydrosulfite. The rate of formation of Na₂S₂O₃ increases with increasing temperature, increasing hydrosulfite concentration, and decreasing pH. By minimizing the low pH gradients, the formation of Na₂S₂O₃ has been reduced even at high temperatures, such as 100° F.

A typical prior art system is shown in FIG. 2 wherein flow line 12 is fed with liquid sulfur dioxide from tank 10, water from supply line 14, sodium hydroxide from storage tank 15, and a sodium borohydride, sodium hydroxide, and water mixture from storage tank 16. When sodium hydroxide joins flow line 12, reaction (I) referred to above occurs to generate sodium bisulfite. When the BOROL mixture joins the system further downstream, the reaction (II) commences to generate sodium hydrosulfite. The reaction mixture is fed to static (motionless) mixer 18 and then to degassing tank 19 from which gaseous products such as hydrogen are vented from the system to the atmosphere through vent pipe 20.

Flow line 22 leads from the bottom of degassing tank 19, the sodium hydrosulfite solution from the degassing tank being circulated through this flow line by pump 24. Downstream of the pump, the flow line is divided into first line 26 leading to a hydrosulfite storage tank 28 and second line 32, which recycles a proportion of the hydrosulfite solution to flow line 12, downstream of the sodium hydroxide input but upstream of the BOROL mixture input. A minor proportion of the solution from flow line 32 is drawn off along flow line 30 and recirculated directly to degassing tank 19.

A pulp mill or the like is fed with sodium hydrosulfite directly from storage tank 28. As hydrosulfite solution is drawn off from this tank, the fall in level is sensed by level transmitter (LT) 34 which sends an electrical signal to level indicator control (LIC) 36 which in turn transmits a signal to flow indicator control (FIC) 37 which in turn operates current/pressure transducer (I/P) 38 which operates pressure valve 40 to increase the flow of water to the system.

The flow of water through input line 14 is sensed by a magmeter flow meter (MM) which sends a signal to FIC 37 to regulate the flow, and also to flow ratio indicator control (FRIC) 44 which controls the supply of BOROL via I/P transducer 46 which operates pressure valve 48. The flow of BOROL mixture is sensed by magnetic flow meter 50 which sends a signal to the FRIC 44 and to FRIC 52 which controls the input of NaOH via I/P transducer 54 and pressure valve 56. The flow of NaOH into the system is also monitored by magnetic flow meter 58 which sends a flow measurement signal back to FRIC 52.

The various control functions 36, 37, etc., are shown for simplicity in FIG. 2 as individual microprocessor functions. In practice, of course, all these functions are likely to be performed by a single central process computer.

The input of SO₂ to the system is controlled as a function of the pH in the recirculating reaction mixture. The pH of the solution in branch pipe 30 is monitored by pH electrode (pHE) 60 which sends a signal to pH indicator control (pHIC) 62 which controls the input of SO₂ by means of I/P transducer 64 and pressure valve 66. This prior art process is generally operated at a pH of about 6.5. If the monitored pH rises above the predetermined value, pHIC 62 will act to increase the flow of SO₂ and similarly if the pH falls, the input of SO₂ will be reduced.

If the level in degassing tank 19 falls below a predetermined level, level transmitter 70 will send a signal to level indicator control 72 to reduce the flow of hydrosulfite through flow line 26 to storage tank 28, by means of I/P transducer 74 and pressure valve 76.

Using the typical BOROL solution having the composition specified above, in which the molar ratio of NaOH to NaBH₄ is 3.2:1, the overall equation for reactions (I) and (II) above becomes:

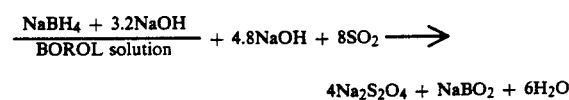

On this basis, assuming an overall reaction efficiency for the above prior art process of 85%, the actual quantity of each reactant required to produce one kilogram of 100% active sodium hydrosulfite is shown to be:

0.533 kg BOROL mixture
0.325 kg NaOH (based on 100%) and
0.865 kg $SO_2$

The amount of water depends on the desired concentration of the final hydrosulfite solution, which is usually 2 to 6 wt%.

Another typical prior art system, that of U.S. Pat. No. 4,788,041, is illustrated in FIG. 3. Referring to FIG. 3 of the drawings, certain features which are essentially identical to those shown in FIG. 2 are given the same reference numerals. As in the embodiment of FIG. 2, sodium hydroxide, water, and sulfur dioxide are mixed to initiate the production of sodium bisulfite and BOROL mixture is then added, the reaction mixture being passed through static mixer 18 and then to degassing tank 19. The mixture entering the static mixer is preferably at a temperature of about 10° C. Static mixer 18 has water cooling jacket 17, whereby the temperature of the reaction mixture is reduced to about 8° C. Again, the flow of sodium hydrosulfite solution from the degassing tank to storage is controlled by level transmitter 70, LIC 72, I/P transducer 74, and pressure valve 76. There is also provided control valve 89 and magnetic flow tube (MFT) 77 so that the flow rate of hydrosulfite to storage can be monitored.

The concentration of the hydrosulfite leaving the recycle stream is generally in the range of 9-12 wt. %. Increased yields can be obtained by operating the process at this relatively high concentration, but storage stability is reduced. If, therefore, the hydrosulfite is not to be used immediately, it should be diluted down to a concentration of 4-5 wt %. For this purpose, water is supplied and tapped off from main water supply 114. The supply of diluting water to the hydrosulfite solution is controlled by valve 171 operated by I/P transducer 172 and conductivity control microprocessor (CCD) 173 which monitors the concentration of the solution, downstream of the input of diluting water, by means of conductivity cell 174. Pump 24 for the recycled stream of hydrosulfite in this embodiment is positioned downstream of pH electrode 61, which controls the input of $SO_2$ as will be described below. Downstream of pump 24, and of the point at which hydrosulfite is drawn off to storage, the solution passes through heat exchange 90, another control valve 91, and rotameter 92. The heat exchanger cools the reaction mixture from about 12° C., to which it has risen as a result of the exothermic reaction, to about 7° C. The flow line is then divided at a point 80 into first and second flow lines 82, 84. Manually-controlled valve 81 in flow line 84 controls the relative proportions of the flow passing through the two flow lines. Preferably 20-60% of the flow, typically 40%, passes through first flow line 82 and 49-80%, typically 60%, through second flow line 84.

Sodium hydroxide from supply tank 115 is fed into flow line 82 at point 100. $SO_2$ from supply tank 110 joins water supply line 114 at position 102 and the resulting mixture is fed into flow line 82 at position 104, downstream of the NaOH input rather than upstream as in the previous BOROL process. The reaction mixture then passes through static mixer 98 and into main static mixer 18 where BOROL mixture from supply tank 16 is fed into the system. Second flow line 84 rejoins flow line 82 at position 86 between two static mixers 98, 18. The flow rate of the recirculating mixture entering static mixer 18 is monitored by pressure indicator (PI) 94 which sends a signal to pressure indicator control (PIC) 95 which in turn feeds a signal to I/P transducer 96 which operate pressure valve 97 controlling the flow to static mixer 18.

To reduce still further the change in pH as the $SO_2$ joins the recycle stream a proportion of the NaOH (suitably 10-50% of the total NaOH flow and preferably 35-40%) is fed through bypass line 101 to the $SO_2$ input line, joining this line downstream of position 102 at which the $SO_2$ joins the water flow. The flow through the bypass line is controlled by valve 103, which may be operated automatically in response to monitored flow rates of water, NaOH and $SO_2$.

The hydrosulfite storage tank 28 of FIG. 2 is not shown in FIG. 3, but it will be understood that the system of FIG. 3 may feed a storage tank in exactly the same way as in FIG. 2.

A system of FIG. 3 has an automatic control system operating in a similar way to that of FIG. 2. Input signals S which may correspond to level signals from a storage tank as in FIG. 2, are fed to FIC 137, which in turn sends signals to I/P transducer 138 to operate pressure valve 140 in water feed line 114. FIC 137 also receives the flow rate data from magnetic flow tube (MFT) 142 in the water flow line, and transmits flow data to FRIC 144 which controls the supply of BOROL mixture to static mixer 18 by means of I/P transducer 146 and pressure valve 148 monitoring the flow rate by means of MFT 150.

Flow rate data for water and the BOROL mixture are also transmitted by the FRIC 144 to FRIC 152 and to combined FRIC and pH indicator control 162 which control the input of sodium hydroxide and sulfur dioxide respectively. FRIC 152 controls the input of NaOH by means I/P transducer 154 and pressure valve 156 and monitors the input of NaOH by means of magnetic flow tube 158. Control unit 162 also receives pH data from pH electrode 61, as well as from micro-massmeter 160 which monitors the flow rate of $SO_2$. This flow rate is controlled by means of I/P transducer 164 and pressure valve 166.

The signals to I/P transducer 164 from control unit 612 are preferably determined to a much greater extent by the flow ratio data than by the pH data. Suitably the signals are based to an extent of 75-85%, preferably about 80%, on flow ratio data and 15-25%, preferably about 20%, on pH data.

By splitting the recycle stream at location 80, a more balanced input of reactants is obtained since there is less difference in volume between the recycle stream and the reactants entering it. There is also a less drastic dilution of the reactants.

Figures 4, 8:
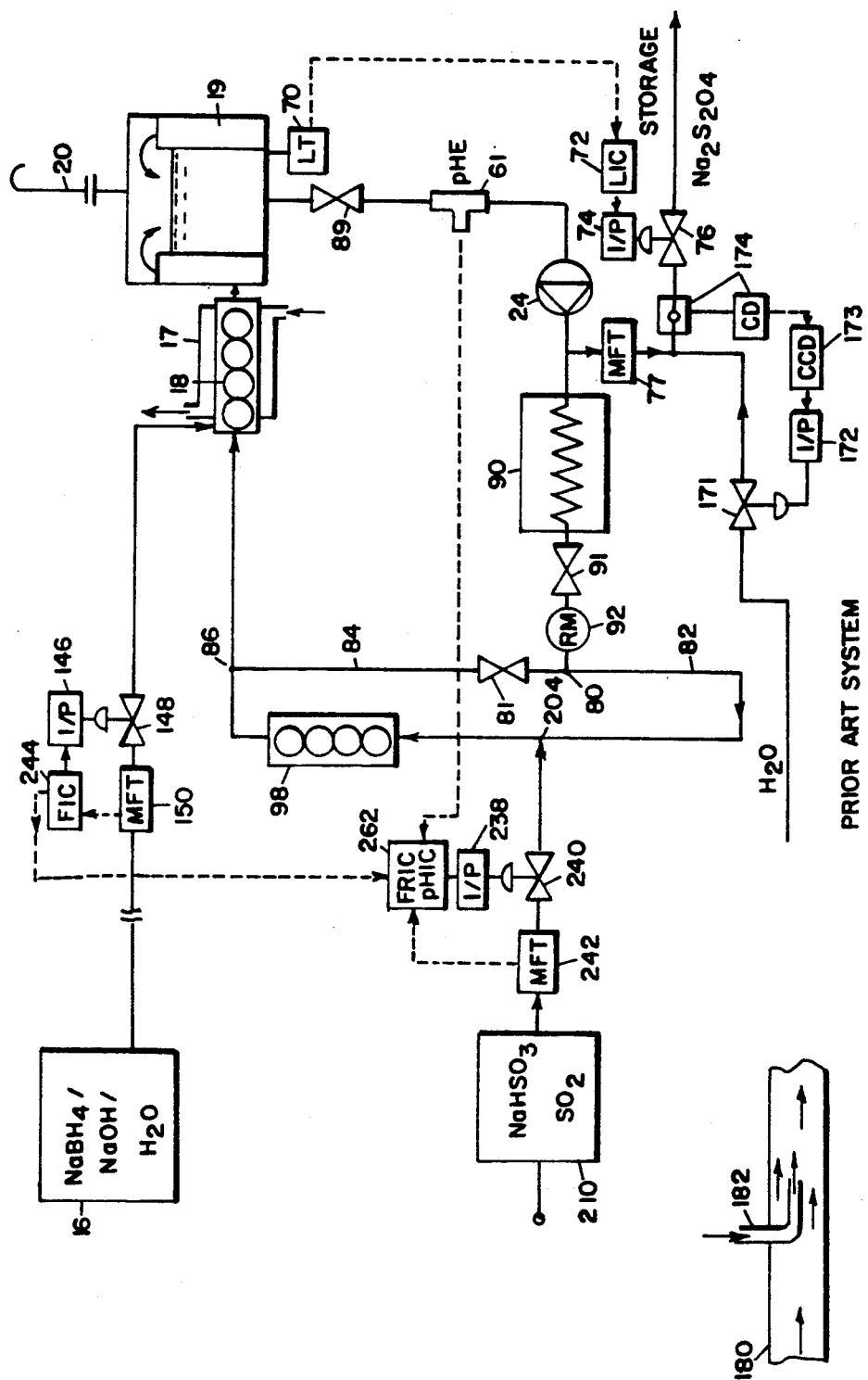
FIG. 4 is a flow diagram illustrating another prior art process described in U.S. Pat. No. 4,788,041.
FIG. 8 illustrates isokinetic mixing apparatus that may be used in the practice of the invention.

The system shown in FIG. 4 uses, instead of separate inputs of NaOH, $So_2$ and water, a single input of an aqueous solution of sodium bisulfite and sulfur dioxide. In this Figure, components which are identical to those of FIG. 3 are given the same reference numerals and will not be described in detail. This system is similar to that of FIG. 3 insofar as it comprises a recycling system with cooled static mixer 18, degassing tank 19, pump 24, a draw-off point and diluting system for the product, heat exchanger 90 and a split stream comprising input line 82 and bypass line 84.

Input line 82 has single input point 204 for an aqueous $SO_2/NaHSO_3$ solution from supply 210. The flow of this solution is controlled by valve 240 actuated by I/P transducer 238 which in turn is controlled by FRIC/pHIC 262. This unit receives signals from pH electrode 61 as in the system of FIG. 3, and also from magnetic flow tube 242 monitoring the flow rate of the bisulfite/$SO_2$ solution and from FIC 244 which monitors the flow of sodium borohydride solution to the system. This latter unit replaces FRIC 144 of FIG. 3 since it receives only the flow rate data from magnetic flow tube 150. As in the system of FIG. 3, control unit 262 preferably controls the input of the bisulfite/$SO_2$ solution to an extent of about 80% on the basis of flow ratio data and 20% on the basis of pH data.

FIG. 8, shows an isokinetic mixer (as depicted in aforementioned U.S. Pat. No. 4,788,041) which is the way in which the various reactants are preferably fed to the system in accordance with certain embodiments of the invention, such as at input points 100, 102, and 104 in FIG. 6. A similar system can be used to feed the BOROL mixture, such as at input point 204 in FIG. 7, rather than feed it directly to the static mixer as shown in FIG. 4. In FIG. 8, the main flow line is indicated by 180, and the ingredient(s) being added, such as NaOH or $SO_2/H_2O$ mixture, enters the system through nozzle 182 positioned with its exit end substantially at the center and coaxial with the flow line, and oriented in the flow direction of the stream. The flow rate of the reactant entering the system through nozzle 182 is substantially the same as that of the circulating reaction mixture in the flow line 180. This means that all of the reactant entering the system at this point is carried along by the circulating reaction mixture, without any of it adhering to the sides of the flow line around the entry point. This helps to ensure that a homogeneous mixture is obtained and that sudden changes in composition and, more especially pH, are avoided.

Figure 9:
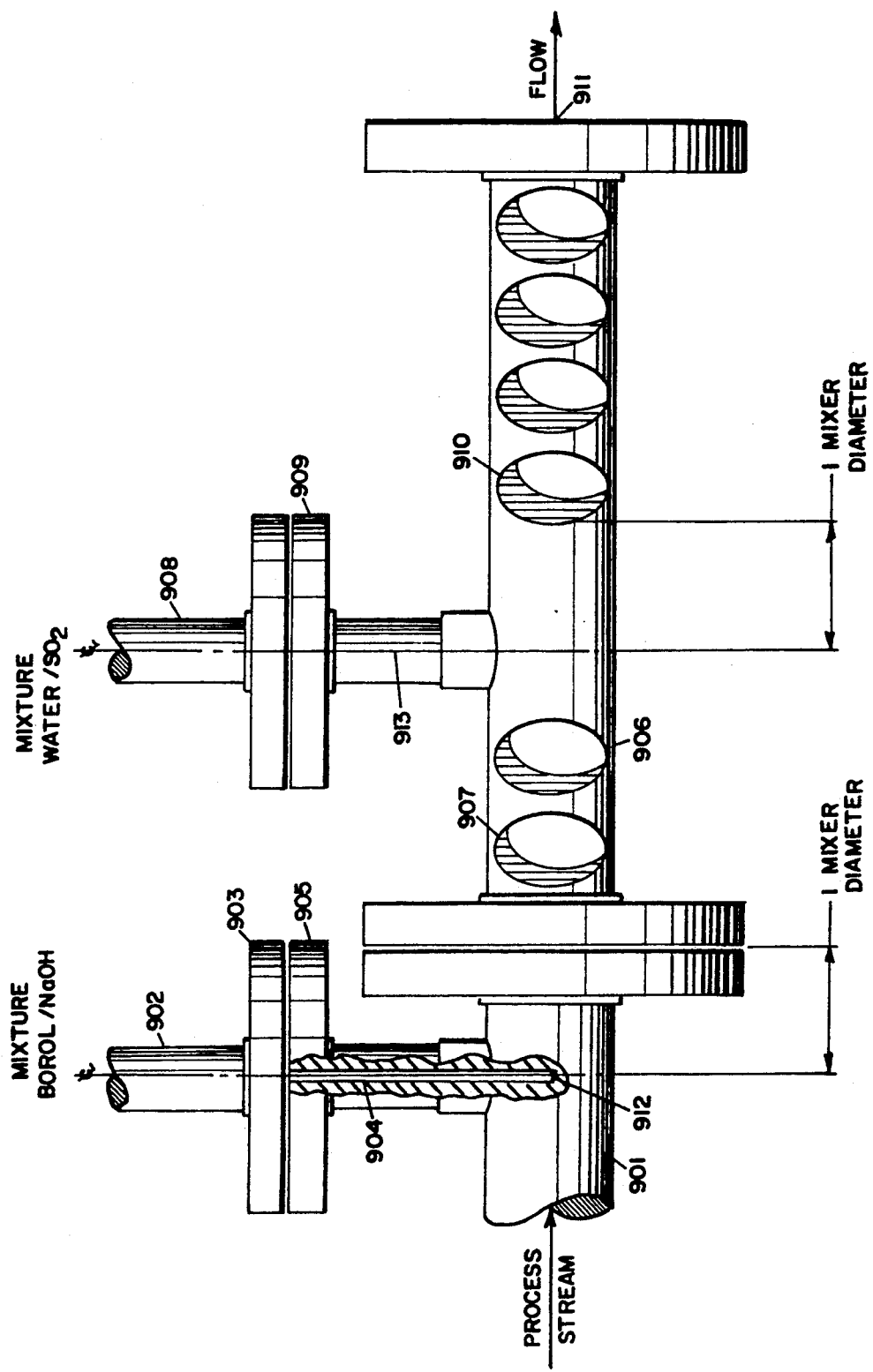
FIG. 9 illustrates a two-compartment motionless (sometimes called static) mixing apparatus that may be used in the practice of the invention.

Another type of mixing is illustrated in FIG. 9. This type of mixing is often referred to as motionless or static mixing. The device serves to deflect the stream with the use of mixing elements and thereby promotes the mixing (and reaction) of the process flow stream with a given additive.

Taking into consideration that the system operates under a slight excess of bisulfite (typically a 10–15% excess), the balanced equation (based on 90% yield) can be transformed into:

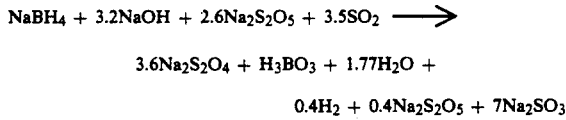

$$NaBH_4 + 3.2NaOH + 2.6Na_2S_2O_5 + 3.5SO_2 \longrightarrow$$
$$3.6Na_2S_2O_4 + H_3BO_3 + 1.77H_2O +$$
$$0.4H_2 + 0.4Na_2S_2O_5 + 7Na_2SO_3$$

Based on this equation, the actual quantity of each material required to produce one kilogram of 100% active hydrosulfite is shown to be:
0.503 kg BOROL mixture
0.332 kg NaOH (at 100%) and
0.889 kg $SO_2$ While there are various different ways in which the percentage yield obtained by the process of the invention may be calculated, the mass balance method will be used in this application.

This yield determination method is based on the stoichiometry of the balanced equation for conversion of the BOROL solution reactant feed to the hydrosulfite product. At 100% conversion, 1 part of the BOROL solution reactant will produce 2.208 parts of hydrosulfite. The theoretical concentration of product hydrosulfite solution expressed as percent by weight is the quotient of the mass of hydrosulfite produced at 100% conversion of the BOROL solution reactant and the total mass of the reactant chemical feeds.

The actual concentration of the product hydrosulfite solution is determined by titration to determine the actual hydrosulfite content expressed as percent by weight. The percent yield is then calculated as the quotient of the actual hydrosulfite concentration and the theoretical concentration as determined by the stoichiometry of the balanced equation and reactant chemical feeds.

Figure 6:
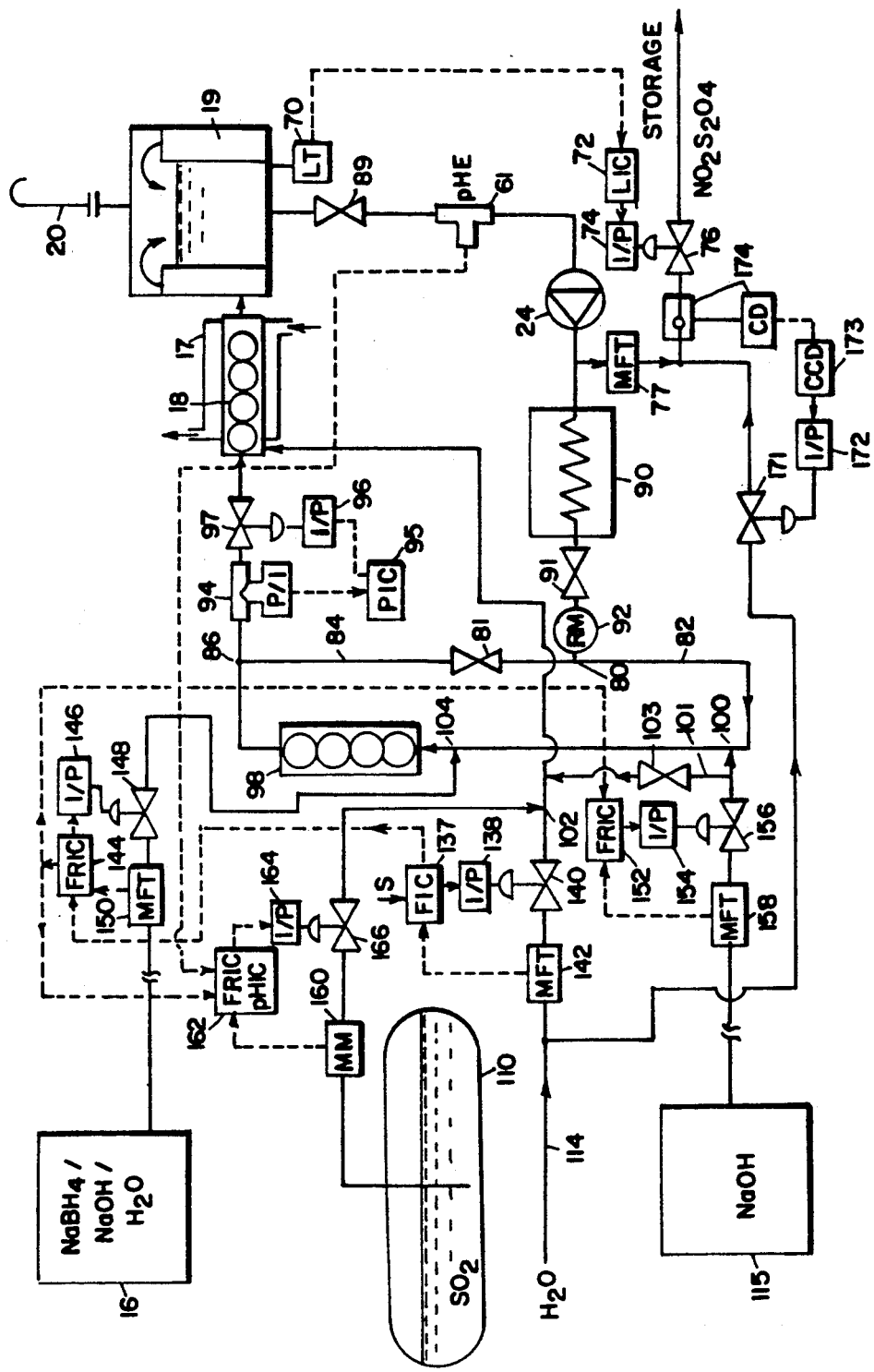
FIG. 6 is a flow diagram that illustrates changes made to the process shown in FIG. 3 that are in accordance with the invention of this application.
Figure 7:
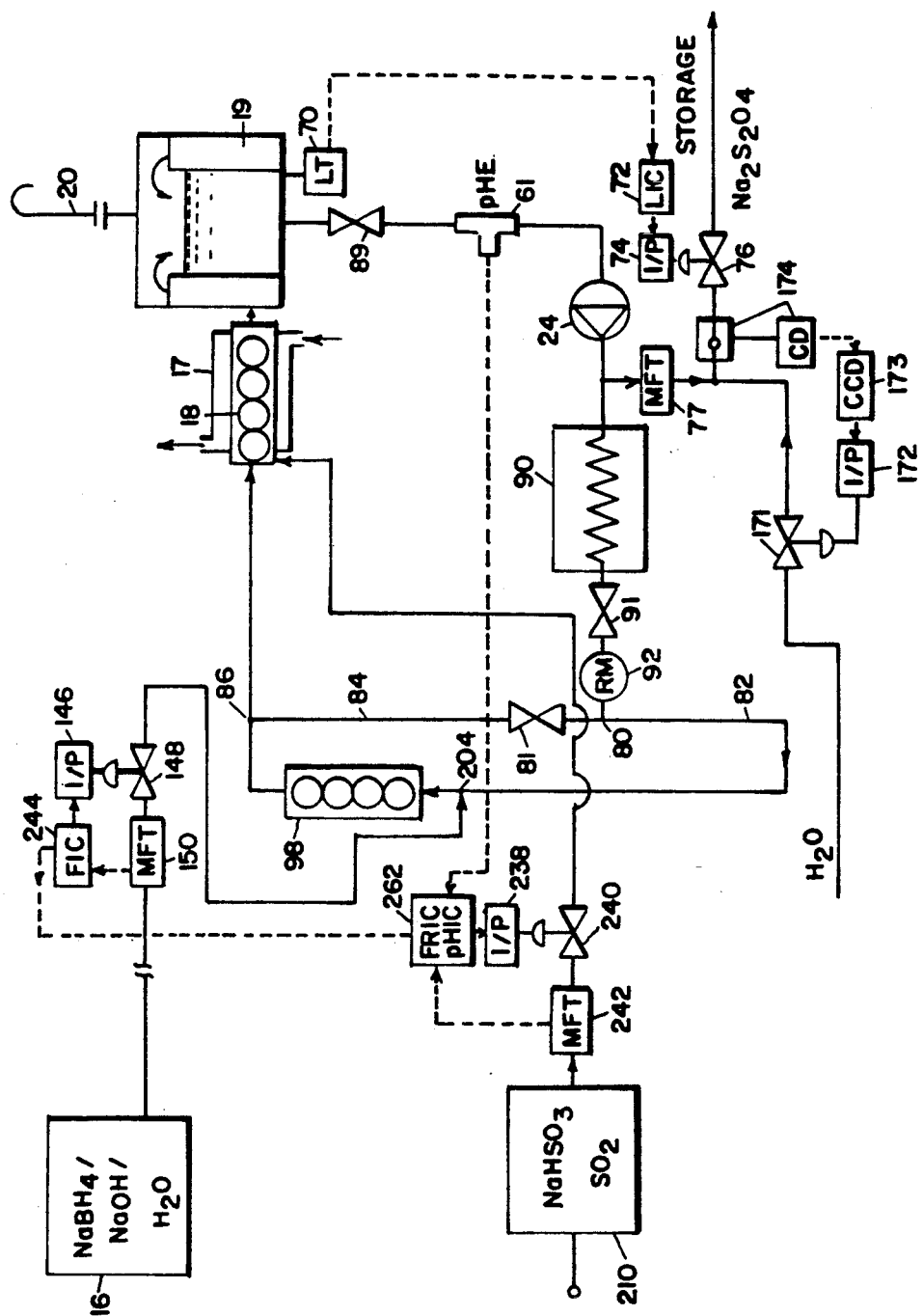
FIG. 7 is a flow diagram that illustrates changes made to the process shown in FIG. 4 that are in accordance with the invention of this application.

FIGS. 5, 6, and 7 are systems in accordance with the invention and variations of FIGS. 2, 3, and 4, respectively. In these Figures, components which are identical to those of the corresponding Figure are given the same reference numeral and will not be described in detail. FIGS. 5, 6, and 7 illustrate various ways in which the feed systems of the prior art may be altered to permit the BOROL mixture to be added to the system prior to that of the $SO_2$ containing stream and thereby obtain increased yields.

Specifically, FIG. 5 illustrates an embodiment of the invention where sulfur dioxide and water are introduced proximate to the second mixing compartment in motionless mixer 18 and the BOROL solution and NaOH solution are introduced to the process stream flow line prior to the first mixing compartment of motionless mixer 18. This introduction arrangement is in reverse order to that specified in FIG. 2. The feeds from storage tanks 15 and 16 could be introduced to the system in reverse order or by combining such feeds. This procedure is generally suitable for all of FIGS. 2, 3, and 4 as well as FIGS. 5, 6, and 7. A two-compartment motionless mixer, only generally shown in FIG. 5, is shown in more detail in FIG. 9. And it can be seen that this mixer unit is cylindrical and of uniform or constant diameter.

FIG. 6 illustrates another embodiment of the invention where sulfur dioxide and water are introduced proximate to motionless mixer 18 and the BOROL solution and NaOH solution are added proximate to motionless mixer 98 at location 104. This introduction arrangement is in reverse order to that specified in FIG. 3.

FIG. 7 illustrates yet another embodiment of the invention where sulfur dioxide and sodium bisulfite are introduced proximate to motionless mixer 18 and the BOROL solution is added proximate to motionless mixer 98 at location 204. This introduction arrangement is in reverse order to that specified in FIG. 4.

DESCRIPTION OF THE PREFERRED EMBODIMENTS

While the order of introduction of the various additives is the most important aspect of the invention, there are several other aspects of the invention that are preferred when practicing the invention. Improved results and reactivity are obtained through intimate mixing of the additives and the process flow stream. The preferable mode of mixing is that of using a motionless mixer; a two-compartment motionless mixer being very preferred.

It has also been discovered that the additives should be introduced to the process flow stream at a location proximate to the mixer; preferably at a distance prior to the entrance of the mixer that is about the same as the diameter of the mixer.

FIG. 9 depicts a two-stage or two-compartment mixer that further illustrates the preferred method for adding the reactants to and mixing the reactants with the process stream in accordance with the invention. The process stream containing sodium hydrosulfite passes through pipe 901. The mixture of BOROL solution and NaOH solution flows through pipe 902 and subsequently through a flanged nozzle 903 before entering the process stream. Nozzle 903 consists of a flange and small diameter tube 904 inserted through a flanged nipple 905. It is preferred that the inside diameter of tube be such that the velocity of the mixture passing through 904 is equal to or greater than the velocity of the process stream passing through pipe 901. The exit of tube 904 at point 912 must be near the center of pipe 901 and at a distance from mixer 906 not greater than one (1) diameter of said mixer.

After entering the process stream, the mixture of BOROL solution and NaOH solution is mixed with the process stream in the first section or compartment of mixer 906. This is accomplished by mixing elements 907. These elements are of a helical type, baffles, or a corrugated material (metal or plastic) which are placed in a pipe or conduit in order to cause a change in the flow direction and utilize the energy of the flowing fluid to create turbulence and produce mixing. It is preferred that two to four mixing elements be utilized in the first section of mixer 906. After passing through mixing elements 907, at point 913, a homogeneous mixture of sodium hydrosulfite ($Na_2S_2O_4$) and BOROL solution and NaOH solution at a pH of about 13.0 is present. At this point, the solution of water and sulfur dioxide being carried in pipe 908, passes through nozzle 909 and enters mixer 906 at point 913. The velocity through nozzle 909 should be approximately equal to the velocity through mixer 906. The solution of water and sulfur dioxide$_2$ is mixed with the mixture of $Na_2S_2O_4$, BOROL solution, and NaOH solution in the second section of mixer 906 with mixing elements 910. These elements are generally the same as item 907, and generally three to four mixing elements are preferred. In the second section of mixer 906 the sulfur dioxide combines with sodium hydroxide to form sodium bisulfite which subsequently reacts with the $NaBH_4$ to form $Na_2S_2O_4$. The flow exits mixer 906 at location 911 and immediately enters a degassing tank (not illustrated). The pH of the process at location 911 is about 5.5-6.5.

The system described above has been found to lead to yields in the range of 90-94%; an improvement over the prior art system as described in FIG. 2. The important factors in achieving this are believed to be creating a more stable, alkaline medium for the $NaBH_4$ by mixing the BOROL solution and NaOH solution first with the process stream, minimizing low pH gradients below the reaction pH, and providing rapid and intimate mixing of the chemical reactants within short intervals as accomplished by a two-compartment motionless mixer and nozzles.

The invention will be further illustrated by the following examples:

EXAMPLE 1

In a system as shown in FIG. 2, the mixture of water and sulfur dioxide is added to the process stream before the solution of NaOH and the BOROL solution, and rapid and intimate mixing is not ensured. The BOROL solution for this and all other Examples is 12 wt% sodium borohydride, 40 wt% sodium hydroxide, and 48 wt% water. The system operating parameters are as follows:

| Feed Rates | |
|---|---|
| BOROL solution: | 0.168 US gpm |
| 20% NaOH solution: | 0.495 US gpm |
| Liquid $SO_2$: | 0.260 US gpm |
| Water: | 7.35 US gpm |
| Reaction pH: | 6.2 |
| Reaction Temperature: | 83° F. |
| Recycle Flow rate: | 30 US gpm |
| Actual Hydrosulfite: | 5.08% |
| Theoretical Hydrosulfite: | 6.02% |
| Percent Yield: | 84.4% |

EXAMPLE 2

This system is depicted in FIG. 2; however, the NaOH solution flow is replaced with a sodium bisulfite solution. The bisulfite solution is first added to the solution of water and $SO_2$ to form a mixture of bisulfite/$SO_2/H_2O$ which is then added to the process stream upstream of the BOROL solution. As in Example 1, rapid and intimate mixing is not ensured. The system operating parameters are as follows:

| Feed Rates | |
|---|---|
| BOROL solution: | 0.255 US gpm |
| Sodium Bisulfite solution: | 1.43 US gpm |
| Liquid $SO_2$: | 0.180 US gpm |
| Water: | 26.0 US gpm |
| Reaction pH: | 6.2 |
| Reaction Temperature: | 75° F. |
| Recycle Flow Rate: | 50 US gpm |
| Actual Hydrosulfite: | 2.27% |
| Theoretical Hydrosulfite: | 2.73% |
| Percent Yield: | 83.2% |

EXAMPLE 3

This system is depicted in FIG. 5; however, the sequence of the chemical reactant addition is reversed such that the solution of water and $SO_2$ is added to the process stream upstream of the mixture of BOROL solution and NaOH solution. Chemical reactant addition is accomplished with nozzles located no more than one (1) mixer diameter upstream of the respective mixing stage such that rapid and intimate mixing is ensured. The system operating parameters are as follows:

| Feed Rates | |
|---|---|
| BOROL solution: | 0.130 US gpm |
| 50% NaOH solution: | 0.150 US gpm |
| Liquid $SO_2$: | 0.233 US gpm |
| Water: | 16.1 US gpm |
| Reaction pH: | 6.3 |
| Reaction Temperature: | 55° F. |
| Recycle Flow Rate: | 60 US gpm |
| Actual Hydrosulfite: | 2.04% |
| Theoretical Hydrosulfite: | 2.35% |
| Percent Yield: | 86.8% |

EXAMPLE 4

This system is depicted in FIG. 5 and represents the invention described herein. The system operating parameters are as follows:

| Feed Rates | |
| --- | --- |
| BOROL solution: | 0.135 US gpm |
| 50% NaOH solution: | 0.158 US gpm |
| Liquid $SO_2$: | 0.238 US gpm |
| Water: | 16.8 US gpm |
| Reaction pH: | 6.3 |
| Reaction Temperature: | 78° F. |
| Recycle Flow Rate: | 35 US gpm |
| Actual Hydrosulfite: | 2.15% |
| Theoretical Hydrosulfite: | 2.34% |
| Percent Yield: | 91.8% |

In summary, Examples 1 and 2 illustrate typical percent yields when rapid and intimate mixing is not present. In example 3, when rapid and intimate mixing is present, the percent yields are increased by 3 to 4 points. Rapid and intimate mixing of the chemical reactants, particularly the mixture of BOROL solution and NaOH solution, minimizes the time and severity of a pH gradient in the process stream through a pH range below the desired reaction pH of 5.5-6.5; therefore, the hydrolysis of $NaBH_4$ is minimized.

The hydrolysis of $NaBH_4$ is further minimized by adding the mixture of BOROL solution and NaOH solution first to process stream with rapid and intimate mixing as described in this invention. Example 4 illustrates the percent yields which, compared to Example 3, provide a percent yield increase of 4-5 points and 7-9 points compared to Examples 1 and 2.

We claim:

1. An apparatus for producing sodium hydrosulfite by reacting, in an aqueous solution, sodium borohydride, sodium hydroxide, sulfur dioxide and sodium bisulfite, which comprises:
   (a) means for establishing a process flow stream comprising an aqueous mixture of at least sodium hydrosulfite and sodium bisulfite;
   (b) input means for introducing a first reaction mixture comprising sodium borohydride, sodium hydroxide and water into said process flow stream;
   (c) input means for introducing a solution consisting essentially of sodium hydroxide into said flow stream; and
   (d) input means for introducing a second reaction mixture comprising water and sulfur dioxide into said flow stream downstream from both the (b) and (c) input means so that introduced mixtures react to form an aqueous solution of sodium hydrosulfite in an increased pH environment.

2. The apparatus of claim 1 comprising: (e) additional means for rapidly and intimately mixing each of said first and second reaction mixtures and said process flow stream by passing the mixtures separately into first and second immediately adjacent compartments having substantially the same diameter and each containing static mixing elements housed in a single cylindrical motionless mixer, wherein means is provided so that each mixture is introduced at a distance upstream from each compartment that is about the same distance as that of a compartment diameter.

3. The apparatus of claim 2 wherein: each of said static mixing elements is a helix.

4. The apparatus of claim 1 which further includes intimate mixing means connected to said process flow stream for intimately mixing said first reaction mixture and said process flow stream at a location proximate to where said first reaction mixture is introduced.

5. The apparatus of claim 4 which further includes intimate mixing means connected to said process flow stream for intimately mixing said second reaction mixture and said process flow stream at a location proximate to where said second reaction mixture is introduced.

6. The apparatus of claim 5 wherein: said intimate mixing means comprises isokinetic means.

7. The apparatus of claim 5 wherein: said intimate mixing means comprises a motionless mixer having mixing elements.

8. The apparatus of claim 7 wherein: said intimate mixing means comprises a single cylindrical unit having immediately adjacent first and second mixing element compartments, both being of substantially the same constant diameter.

9. The apparatus of claim 8 wherein: said motionless mixer has a diameter and said input means for said first reaction mixture is located at a distance upstream from said first mixing element compartment that is about the same as the diameter of said motionless mixer and said input means for said second reaction mixture is located at a distance upstream from said second mixing element compartment that is about the same as that of the diameter of said motionless mixer.

10. The apparatus of claim 4 wherein: said intimate mixing means comprising isokinetic means.

11. The apparatus of claim 4 wherein: said intimate mixing means comprises a motionless mixer having mixing elements.

12. The apparatus of claim 11 wherein: said motionless mixer has a diameter and said input means for said first reaction mixture is located at a distance upstream from said motionless mixer that is about the same as that of the diameter of said motionless mixer.

13. The apparatus of claim 1 which further includes intimate mixing means connected to said process flow stream for intimately mixing said second reaction mixture and said process flow stream at a location proximate to where said second reaction mixture is introduced.

14. The apparatus of claim 13 wherein: said intimate mixing means comprises isokinetic means.

15. The apparatus of claim 13 wherein: said intimate mixing means comprises a motionless mixer having mixing elements.

16. The apparatus of claim 15 wherein: said motionless mixer has a diameter and said input means for said second reaction mixture is located at a distance upstream from said motionless mixer that is about the same as that of the diameter of said motionless mixer.

17. An apparatus for producing sodium hydrosulfite by reacting, in an aqueous solution, sodium borohydride, sodium hydroxide, sulfur dioxide and sodium bisulfite, which comprises:
   (a) means for establishing a process flow stream comprising an aqueous mixture of at least sodium hydrosulfite and sodium bisulfite;
   (b) input means introducing a first reaction mixture comprising sodium borohydride, sodium hydroxide and water into said process flow stream;
   (c) input means for introducing a solution consisting essentially of sodium hydroxide into said process flow stream;
   (d) input means for introducing a second reaction mixture comprising water and sulfur dioxide into said process flow stream at a position separate from both the (b) and (c) introductions, and (e) means for rapidly and intimately mixing said first and second reaction mixtures and said process flow stream by separately passing the mixtures into first and second immediately adjacent compartments having substantially the same constant diameter and each containing static mixing elements housed in a single cylindrical motionless mixer, including means wherein each mixture is introduced at a distance upstream from each compartment that is about the same distance as that of a compartment diameter.

18. The apparatus according to claim 17 wherein: each of said static mixing elements is a helix.

19. The apparatus according to claim 17 wherein: the input means (d) is introduced to the first compartment of the mixer.

20. An apparatus for producing sodium hydrosulfite by reacting, in an aqueous solution, sodium borohydride, sodium hydroxide, sulfur dioxide and sodium bisulfite, which comprises:
 (a) means for establishing a process flow stream comprising an aqueous mixture of at least sodium hydrosulfite and sodium bisulfite;
 (b) input means for introducing a first reaction mixture comprising sodium borohydride, sodium hydroxide and water into said process flow stream;
 (c) input means for introducing a second reaction mixture comprising sodium bisulfite and sulfur dioxide into said process flow stream downstream from the (b) introduction so that introduced mixtures react to form an aqueous solution of sodium hydrosulfite in an increased pH environment.

21. The apparatus of claim 20 comprising: (e) additional means for rapidly and intimately mixing each of the first and second reaction mixtures and said process flow stream by passing the mixtures separately into first and second immediately adjacent compartments having substantially the same diameter and each containing static mixing elements housed in a single cylindrical motionless mixer, wherein means is provided so that each mixture is introduced at a distance upstream from each compartment that is about the same distance as that of a compartment diameter.

22. The apparatus according to claim 21 wherein: each of said static mixing elements is a helix.

23. An apparatus for producing sodium hydrosulfite by reacting, in an aqueous solution, sodium borohydride, sodium hydroxide and sodium bisulfite, which comprises:
 (a) means for establishing a process flow stream comprising an aqueous mixture of at least sodium hydrosulfite and sodium bisulfite;
 (b) input means for introducing a first reaction mixture comprising sodium borohydride, sodium hydroxide and water into said process flow stream;
 (c) input means for introducing a second reaction mixture comprising sodium bisulfite and sulfur dioxide into said flow stream; and
 (d) means for rapidly and intimately mixing said first and second reaction mixtures and said process flow stream by separately passing the mixtures into first and second immediately adjacent compartments having substantially the same constant diameter and each containing static mixing elements housed in a single cylindrical motionless mixer, wherein each mixture is introduced at distance upstream from each compartment that is about the same distance as that of a compartment diameter.

24. The apparatus according to claim 23 wherein: each of said static mixing elements is a helix.

25. The apparatus according to claim 23 wherein: the input means (c) is introduced to the first compartment of the mixer.

* * * * *